(12) United States Patent
Johnson

(10) Patent No.: US 7,698,499 B2
(45) Date of Patent: *Apr. 13, 2010

(54) METHOD AND APPARATUS FOR ADDRESS FIFO FOR HIGH-BANDWIDTH COMMAND/ADDRESS BUSSES IN DIGITAL STORAGE SYSTEM

(75) Inventor: Brian Johnson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 672 days.

This patent is subject to a terminal disclaimer.

(21) Appl. No.: 11/496,302

(22) Filed: Jul. 31, 2006

(65) Prior Publication Data

US 2006/0265547 A1   Nov. 23, 2006

Related U.S. Application Data

(63) Continuation of application No. 10/644,324, filed on Aug. 20, 2003, now Pat. No. 7,085,880, which is a continuation of application No. 09/541,732, filed on Apr. 3, 2000, now Pat. No. 6,732,223.

(51) Int. Cl.
  G06F 12/00   (2006.01)
  G06F 3/00    (2006.01)
(52) U.S. Cl. ............... 711/105; 710/52; 710/53; 711/E12.001
(58) Field of Classification Search ............ 711/105
  See application file for complete search history.

(56) References Cited

U.S. PATENT DOCUMENTS

| | | |
|---|---|---|
| 4,507,760 A | 3/1985 | Fraser |
| 5,289,584 A | 2/1994 | Thome et al. |
| 5,355,113 A | 10/1994 | McClure |
| 5,426,612 A | 6/1995 | Ichige et al. |
| 5,487,049 A | 1/1996 | Hang |
| 5,519,701 A | 5/1996 | Colmant et al. |
| 5,615,355 A | 3/1997 | Wagner |
| 5,699,530 A | 12/1997 | Rust et al. |
| 5,822,772 A | 10/1998 | Chan et al. |
| 5,852,748 A | 12/1998 | Hawkins et al. |
| 5,917,760 A | 6/1999 | Millar |
| 5,978,884 A | 11/1999 | Yamaguchi et al. |
| 6,151,273 A | 11/2000 | Iwamoto et al. |
| 6,173,238 B1 | 1/2001 | Fujisaki |
| 6,195,079 B1 | 2/2001 | Reddy |
| 6,329,997 B1 | 12/2001 | Wu et al. |
| 6,389,490 B1 | 5/2002 | Camilleri et al. |

*Primary Examiner*—Reginald G Bragdon
*Assistant Examiner*—Aracelis Ruiz
(74) *Attorney, Agent, or Firm*—Traskbritt

(57) ABSTRACT

A method of buffering a data stream in an electronic device using a first-in first-out (FIFO) buffer system wherein the first read latch signal does not change the pointer location of the read pointer. A dynamic random access memory (DRAM) and system are also disclosed in accordance with the invention to include a FIFO buffer system to buffer memory addresses and commands within the DRAM until corresponding data is available.

10 Claims, 6 Drawing Sheets

METHOD AND APPARATUS FOR ADDRESS FIFO FOR HIGH-BANDWIDTH COMMAND/ADDRESS BUSSES IN DIGITAL STORAGE SYSTEM

CROSS-REFERENCE TO RELATED APPLICATIONS

This application is a continuation of application Ser. No. 10/644,324, filed Aug. 20, 2003, now U.S. Pat. No. 7,085,880, issued Aug. 1, 2006, which is a continuation of application Ser. No. 09/541,732, filed Apr. 3, 2000, now U.S. Pat. No. 6,732,223, issued May 4, 2004.

BACKGROUND OF THE INVENTION

1. Field of the Invention

The present invention relates generally to a method and apparatus for capturing high-bandwidth commands and addresses. More particularly, the present invention relates to an address FIFO (first-in first-out) procedure and apparatus for use with a data storage system such as dynamic random access memory ("DRAM"). A FIFO circuit buffers incoming memory address commands until corresponding data arrives to smooth data transfer to memory. The invention also relates to a FIFO buffer system that maintains the write pointer at least one buffer ahead of the read pointer to enable loading of buffers while others are being unloaded.

2. State of the Art

Faster and smaller circuits are the focus of much advancement in semiconductor technology. To address the need for faster and smaller circuits, a group of integrated circuits can be on a common bus. In this configuration, each integrated circuit operates in a coordinated manner with the other integrated circuits on the bus to share data which is transmitted at a high speed. An example of such a high-speed data system is described in U.S. Pat. No. 5,917,760 to Millar (Jun. 29, 1999), the disclosure of which is incorporated herein by reference. Millar describes a high-speed data system using a common bus and a memory subsystem commonly known as SyncLink dynamic random access memory ("SLDRAM"). By providing an appropriate number of memory devices and an efficient control system as used in SLDRAM, very high-speed data transmissions can be achieved. However, faster systems, such as SLDRAM, are now reaching transfer speeds where the memory circuits cannot process the data as fast as the common bus can supply it. More specifically, as data storage address commands arrive at a memory system, if the corresponding data has not arrived yet, the address commands must be stored in a data pipeline until the data arrives. This address command backlog prevents use of the data pipeline by other processes, including transmitting other data, until the data corresponding to the address command arrives. This inconsistency in address command and data arrival times can result in increased data errors and lost data, but most often slows the system by creating a "bottleneck" of address commands.

A pipeline may be divided into any number of stages during which portions of commands are processed and executed. However, in a case of a memory device, such as SLDRAM, the series of processes typically includes: 1) an input process of address data; 2) a decoding process of the address data; 3) a reading process of data from a cell; 4) a transfer process of the data to an output circuit; and 5) an output process of the data. An example of a pipeline system used with DRAM is provided in U.S. Pat. No. 5,978,884 to Yamaguchi et al. (Nov. 2, 1999), the disclosure of which is incorporated herein by reference.

One solution which has been used in memory pipeline systems to correct for the bottleneck problem is to repeat much of the logic circuits within each logic pipeline to accommodate multiple simultaneous commands. However, adding more redundant logic circuits to a system is counter to the desire to make the overall system smaller.

Many telecommunication devices include first-in first-out (FIFO) circuits which temporarily buffer data arriving at a bandwidth higher than the bandwidth of the receiving system. A FIFO circuit stores incoming data, in the order it arrives, in temporary buffers which are then sequentially read out and used by the telecommunication subsystem for which they were intended. The FIFO circuit can store the mass of data that arrives before it can be processed in a temporary storage and read it at a manageable speed. For example, a high-bandwidth data signal can be received at any speed by a telecommunication device, stored in the FIFO buffer, and read out at the processing speed of the device.

One example of a FIFO circuit used in a telecommunication system includes U.S. Pat. No. 4,507,760 to Fraser (Mar. 26, 1985). Fraser discloses random access memory (RAM) organized to act as FIFO memory and a control circuit to implement queue management for incoming/outgoing data in a digital communication system. A read pointer addresses the execution in the RAM from where a word may be read. A write pointer addresses the location in the RAM where a word may be entered. A "last" pointer addresses the location in the RAM where the last word of a complete message is stored.

Another example of a FIFO circuit used in a data communications system is described in U.S. Pat. No. 5,519,701 to Colmant et al. (May 21, 1996). Colmant et al. disclose a system to manage storage of data in FIFO circuits as data is transferred, in either direction, between the host bus and the network. By a queue manager allocating the queues, which have the most activity, the queue manager can improve the speed of the transferring data while reducing the amount of bandwidth that would otherwise be required.

It is desirable to have a memory system that can handle the increased speed demands made by faster circuits, preserve data which arrives faster than the memory circuits can handle it, and do so without the redundancy of circuits required by existing memory systems.

SUMMARY OF THE INVENTION

The present invention addresses the problem of the bottleneck created in high bandwidth to smaller bandwidth systems through the use of a first-in first-out (FIFO) buffer system. The FIFO buffer system of an embodiment of the invention comprises a sequential series or plurality of FIFO buffers associated with read and write counters or pointers to indicate the next FIFO buffer in the sequential series from which data should be read, or to which data should be written. Read and write address decoders are coupled between the FIFO buffers and the read and write counters, respectively, to decode the pointer indicators to a particular FIFO buffer indicator. Of particular interest within the FIFO buffer system is the way in which the read counter operates. The read counter tracks both the current and previous setting for the read counter, yet indicates through the decoder to the FIFO buffers the previous setting as the particular buffer to which the read counter is pointing. A result of this form of operation is that the first read latch signal sent to the read counter is ignored so far as the read counter's indicator is concerned. Following a reset signal, the read counter points to the first of the series of FIFO buffers even after receiving the first read latch signal. Subsequently, the pointer increments one buffer in the sequential series of FIFO buffers for each read latch signal received. Another result of this form of operation is that through the control logic associated with the FIFO buffer system, the write counter always points at least one FIFO buffer ahead of the FIFO buffer to which the read counter is pointing. This allows the FIFO system to read buffers while writing to other buffers.

In particular use with a dynamic random access memory (DRAM) device, the FIFO buffer system stores address commands until corresponding data to be stored arrives at the DRAM. This frees up the DRAM pipelines for use with transferring data rather than storing address commands for the data.

In one embodiment of the FIFO buffer system within a DRAM device, the read counter comprises a plurality of registers to track the current and previous register settings. A two to four decoder is used to decode a two digit binary code indicating the previous state into a signal to activate one of four decoder outputs corresponding to related FIFO buffers. For each decoder output activated, a column address buffer and a row address buffer are activated.

In another embodiment of the FIFO buffer system, the read counter comprises a linear feedback shift register to track both the current and previous register settings and indicate the previous register setting as the FIFO buffer to which the read counter is pointing.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to several drawings herein, wherein:

DETAILED DESCRIPTION OF THE INVENTION

Figure 1:
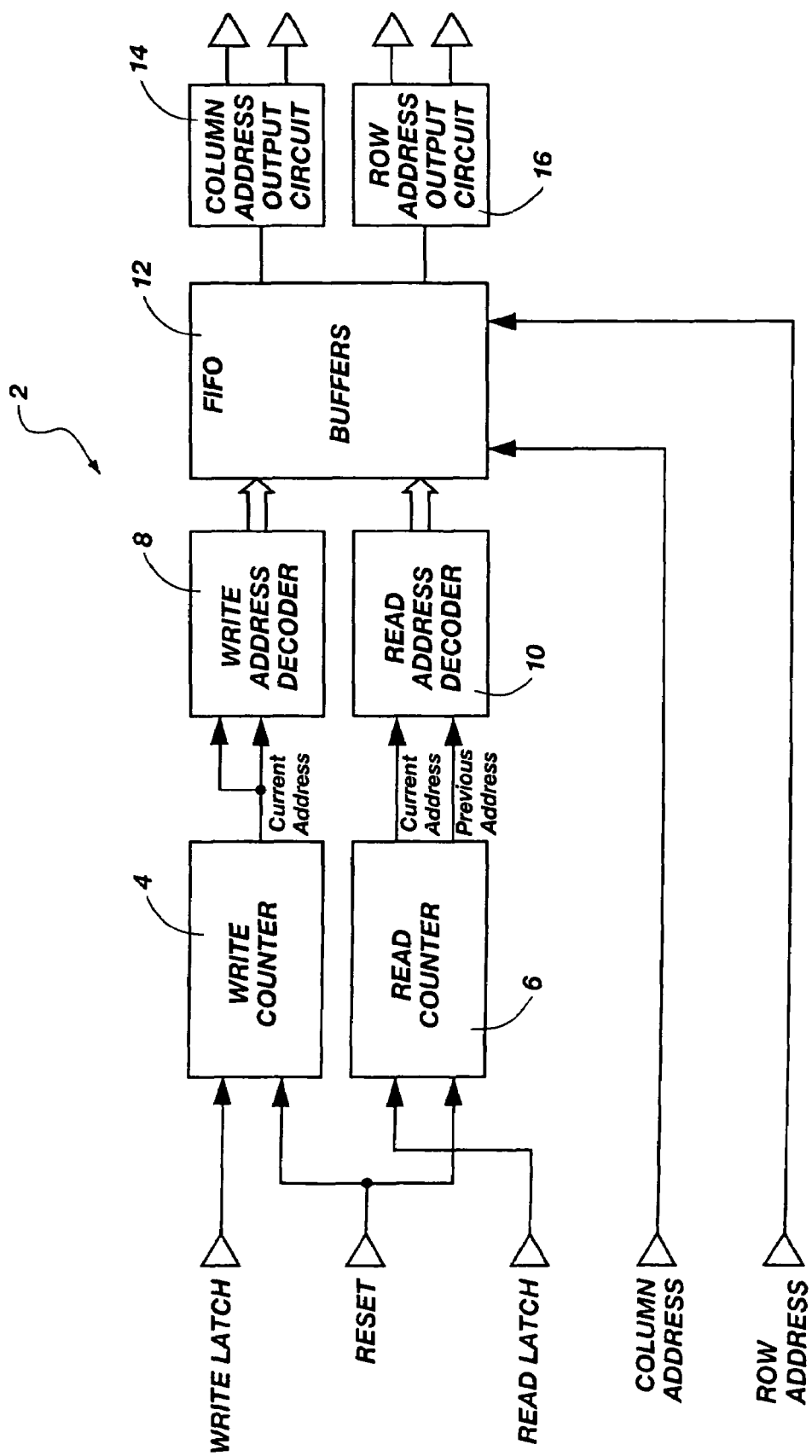
FIG. 1 is a block diagram of a portion of a controller circuit for use in the controller of a DRAM.

FIG. 1 depicts an embodiment of the present invention comprising a circuit 2 of a memory bank control logic circuit for use with dynamic random access memory ("DRAM"). The circuit 2 of the first embodiment includes both write and read counters 4 and 6 (also called pointers), write and read address decoders 8 and 10, FIFO buffers 12, and column and row address output circuits 14 and 16. In a typical FIFO buffer system, an "empty" flag signal indicates whether valid data is contained in a FIFO buffer 12. When a valid write operation occurs, the "empty" flag is replaced by a "full" flag. If a read operation occurs when a read pointer is pointing to the same address as a write pointer, then the empty part will be read, resulting in a delay due to reading an empty buffer. This also moves the read counter forward one whether or not there is any data to be read.

One aspect of the FIFO buffer of the present invention, distinct from counters used in telecommunication systems, is that the read address decoder circuit takes, as the pointer of the buffer address to be read, the previous counter setting rather than the current counter setting. As a result, when the access signal fires to determine whether significant data is contained in the FIFO buffers, the read pointer, which was at address 0 prior to the firing, is still pointing at address 0 after firing. In other words, the first access signal is ignored as far as the pointer is concerned. By using the previous counter setting as the pointer indicator to read from, the first buffer register can contain significant data. Additionally, by ignoring the first access signal, the write address pointer is always at least one position ahead of the read address pointer. A result of maintaining the write address pointer at least one position ahead of the read address pointer is that other registers can be loaded while a register is being read. Without that space, a processor was required to wait until a write process was completed to begin a read process. With the space, the read latency is reduced. Thus, in the present embodiment, the read counter 6 outputs both the current and previous counter setting positions of the FIFO buffer registers.

An alternative to having the read pointer not advance on the first read operation is to set the read pointer reset value as the last address and the write pointer reset value as the first address. This solution, however, may cause problems with read pointer decoding latency and is therefore not preferred. Two reasons for having the read pointer remain at the first address after the first read access are: 1) consistent logic implementation lending itself to pipeline architectures; and 2) masking of read pointer decode latency on subsequent accesses.

Figure 2:
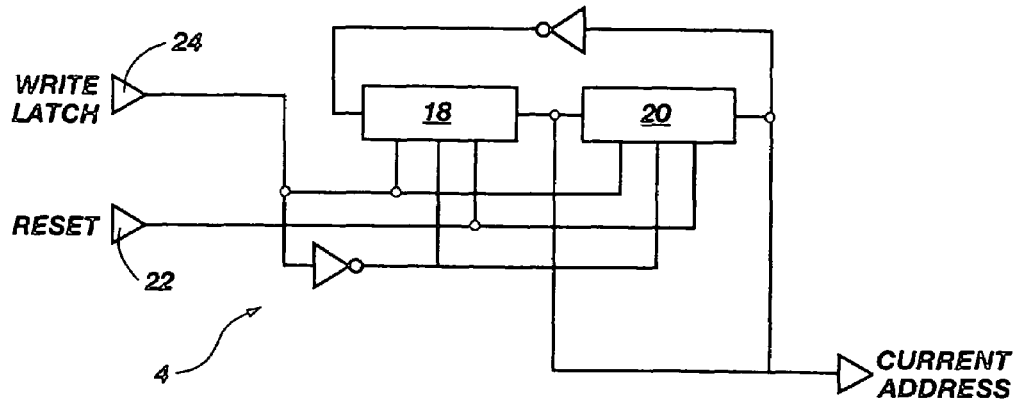
FIG. 2 is a schematic diagram of a write counter.

FIG. 2 is a schematic diagram of a write counter 4 for use with an embodiment of the invention. The write counter 4 includes two registers 18 and 20 and outputs the current counter setting. After receiving a reset signal through a reset terminal or input 22, both of the registers 18 and 20 have a low-output. When the write latch signal fires through a write latch terminal or input 24, the current counter setting signal will indicate a first address having two digits output in serial order. Each time the write latch signal fires through the write latch terminal or input 24, the two registers 18 and 20 will increment the two digit binary address by one until the highest address is reached. For a system with outputs from n=2 registers, the highest address is $2^n-1=3$. The following is a table of the incremental outputs for each of the registers 18 and 20 of the write counter 4:

| First Register 18 | Second Register 20 |
|---|---|
| 0 | 0 |
| 1 | 0 |
| 1 | 1 |
| 0 | 1 |

Figure 3:
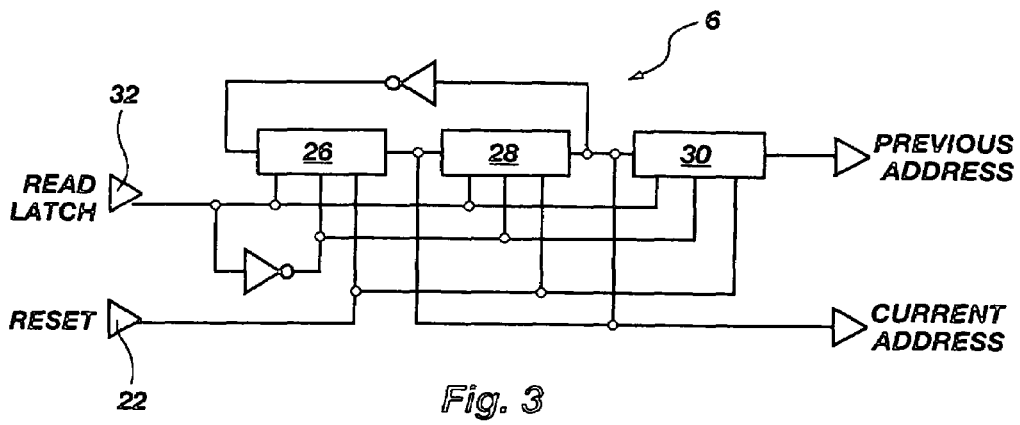
FIG. 3 is a schematic diagram of a read counter.

FIG. 3 is a schematic diagram of a read counter 6 for use with an embodiment of the invention. Like the write counter 4 of FIG. 2, the read counter 6 of FIG. 3 includes two registers 26 and 28, the serial outputs of which indicate the current counter setting. However, unlike the write counter 4, the read counter 6 also includes a third register 30, the output of which, in combination with the output of the second register 28, indicates the previous counter setting of the read counter 6. Thus, after receiving a reset signal through the reset terminal or input 22, all three of the registers 26, 28 and 30 have a low output. When the read latch signal fires through a read latch terminal or input 32 to determine whether or not there is data stored in the memory buffer, the current counter setting signal will indicate a first FIFO buffer address having two digits output in serial order. The previous counter setting signal will similarly indicate a buffer address, but because the second and third registers 28 and 30 will not have incremented yet, the second and third registers will indicate the previous counter setting, both having a low output. Each time the read latch signal fires through the read latch terminal or input 32, the content of the first register 26 will transfer to the second register 28, and the content of the second register will transfer to the third register 30. Thus, the serial combination of the output of the second register 28, which is found as the second bit in the serial output of the current counter setting, with the output of the third register 30, which is the previous counter setting signal, is always one transfer behind the serial combination of the outputs of first register 26 and the second register 28. The following is a table of the incremental outputs for the registers of the read counter:

| First Register 26 | Second Register 28 | Third Register 30 |
|---|---|---|
| 0 | 0 | 0 |
| 1 | 0 | 0 |
| 1 | 1 | 0 |
| 0 | 1 | 1 |
| 0 | 0 | 1 |

Figure 4:
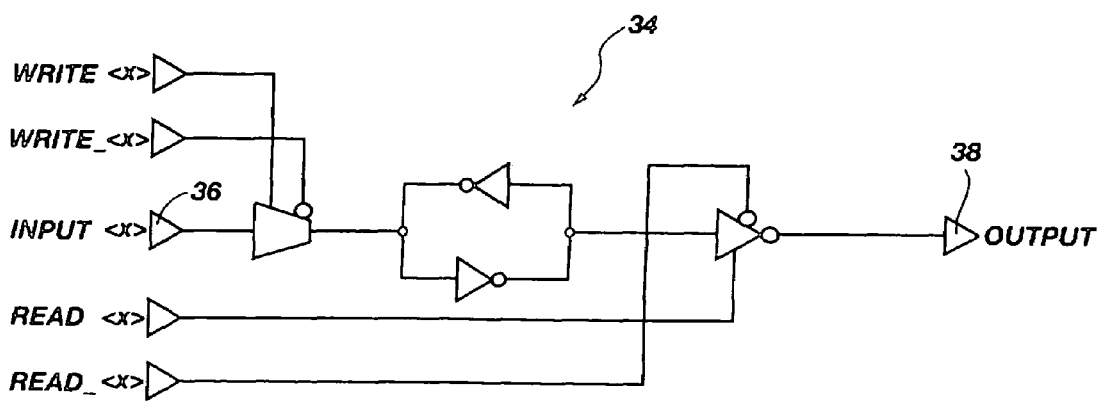
FIG. 4 is a schematic diagram of a FIFO memory buffer.

FIG. 4 is a schematic diagram of a single buffer 34 for use in a FIFO array as buffer address X. The buffer 34 stores data available on an input 36 when either the Read<X> and the Read_<X> or the Write<X> and the Write_<X> indicate the data available on the input 36 is intended for the X buffer and for subsequent output 38. X, of course, may be any address number assigned to the buffer.

As will be understood by one of ordinary skill in the art, there are numerous memory bank address commands which need to be transferred in addition to the Read and Write addresses. Examples of memory bank address commands include Bank Address commands, Restore commands, Auto Precharge commands and Burst commands. Each of the memory bank address command bits is transferred to and stored in the FIFO buffer along with the Read and Write addresses to be buffered until the memory is ready to receive it. The necessary memory bank address command bits and methods and apparatus for enabling their production are well known in the art.

Figure 5:
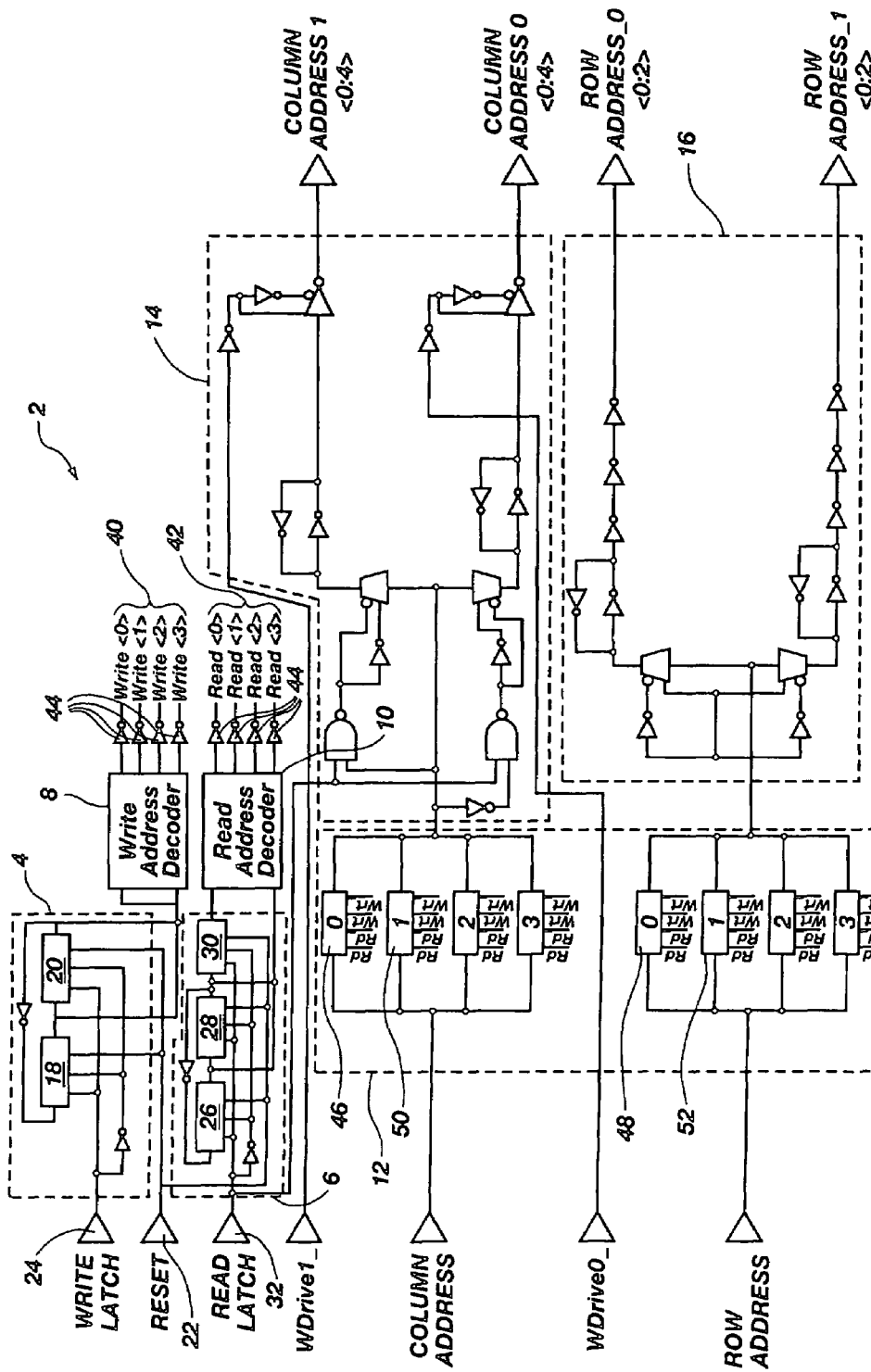
FIG. 5 is a schematic diagram of a FIFO buffer system according to a preferred embodiment of the invention.

FIG. 5 is a schematic diagram of an embodiment of the invention. Examples of possible configurations of column and row address output circuits 14 and 16 are provided. One of ordinary skill in the art will understand the application of the column and row address output circuits 14 and 16 and will further understand that other configurations known in the art are equivalently substituted for the configurations shown. The FIFO buffers 12 contain Read, Read_, Write and Write_signal inputs for each of the numbered buffers 0-3. These Read, Read_, Write and Write_signal inputs correspond to Write and Read signals 40 and 42 originating from inverters 44 connected to the write and read address decoders 8 and 10, respectively.

In operation, after the reset signal fires through reset terminal or input 22, each of the registers 18, 20, 26, 28 and 30 in both the write and read counters 4 and 6, also called pointers, are targeted at address 0. Being targeted at address 0 means they are currently set to read from and write to both the column and row FIFO buffers 0 46 and 48. A write latch signal through write latch terminal or input 24 and a read latch signal through read latch terminal or input 32 are each respectively used to toggle the write counter (or write address pointer) 4 and read counter (or read address pointer) 6. At some time after the first address is latched into FIFO buffers 0 46 and 48, the read latch signal may be asserted to read out the oldest data in the FIFO buffer circuit, for this case, namely the first address latched into FIFO buffers 0 46 and 48. On the first read latch signal, the first and second registers 26 and 28 of the read counter 6 increment by one counter setting to point at the FIFO buffers 1 50 and 52. However, the serial combination of the outputs from the second and third registers 28 and 30, which indicates the previous counter setting rather than the current counter setting, still points at the FIFO buffers 0 46 and 48. Because the read address decoder 10 takes as its input the output from the third register 30 and combines it in serial order with the output from the second register 28, the read counter/decoder combination has, in essence, ignored the first read latch signal. Thus, even after the first read latch signal, the read counter 6 is still pointing to the first FIFO buffers 0 46 and 48. Each successive firing of the read latch-signal through read latch terminal or input 32 will move the read address pointer sequentially ahead one FIFO buffer register. This automatically causes a minimum of one buffer position offset between the read and write pointers. The result of this operation is, while a register is being read, other registers can be loaded since the write pointer is at least one position ahead of the read pointer. There is an assumption, however, that to maintain this relationship, every read pointer change requires at least one preceding write pointer change. It will be obvious to one of skill in the art how to program the logic controlling this circuit to maintain this relationship.

The write and read address decoders 8 and 10 are conventional 2 to 4 decoders, meaning that they take a binary input of two bits and translate it into a signal on one of four outputs corresponding to the value of the two bit binary input. Write signals 40 output from the write address decoder 8 are Write_<0>, Write_<1>, Write_<2> and Write_<3>. Each of these signals as well as its inverse, created by inverters 44, is fed to two of the FIFO buffers 12 corresponding to the number within the brackets < > following the signal type. For example, the Write_<0> and Write <0> signals are fed to each of the FIFO buffers 0 46 and 48. Similarly, the Read signals 42 output from the read address decoder 10, Read_<0>, Read_<1>, Read_<2> and Read_<3>, along with their inverse, are each fed to two of the FIFO buffers 12 corresponding to the number within the brackets < > following the signal type. Thus, Read_<1> and Read <1> are both fed to each of the FIFO buffers 1 50 and 52.

Each of the addresses stored in the FIFO buffers are read out on a first-in first-out basis through column and row address output circuits 14 and 16 which translate and delay the addresses as required by the DRAM in which the circuit 2 of the memory bank control logic circuit is used. It should be understood that, although the preferred embodiment is shown with only four FIFO buffers, it is contemplated that any number of buffers may be used according to the principles taught herein by simply increasing the number of registers in both the write and read counters and appropriately increasing the number of registers in the FIFO buffers.

Figure 6:
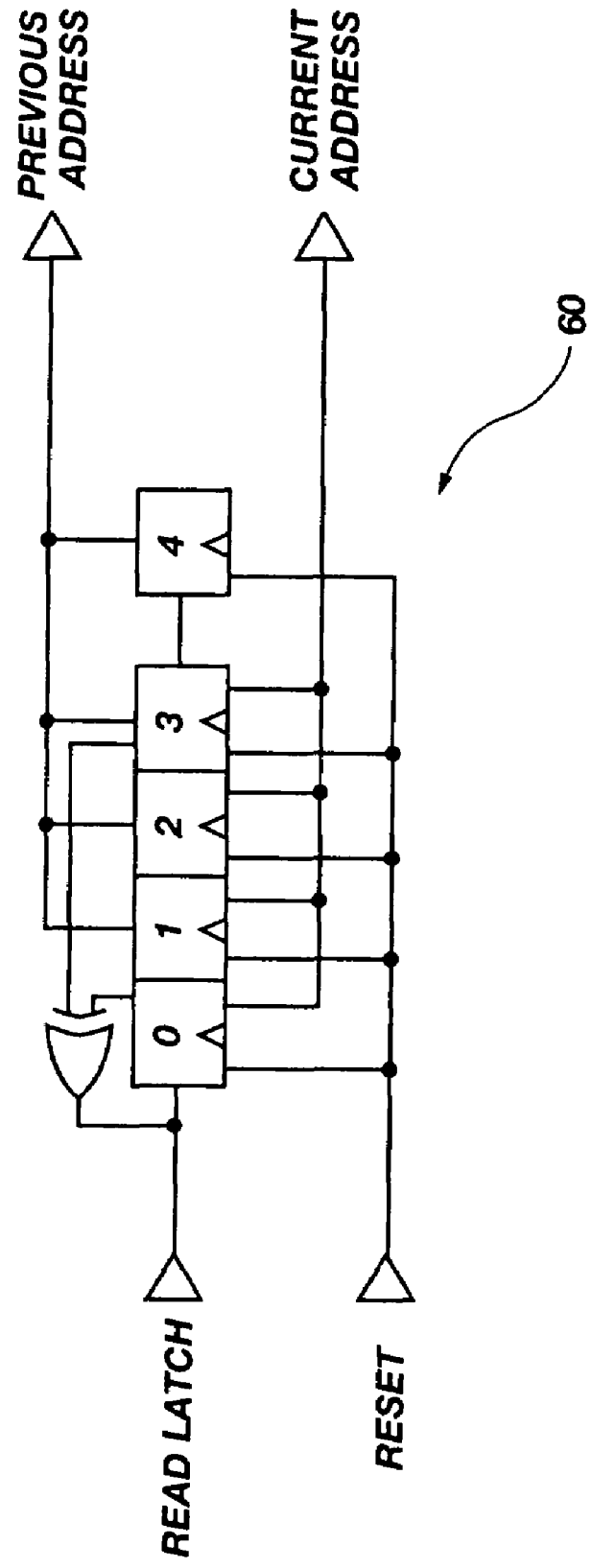
FIG. 6 is a schematic diagram of a read counter for use in a FIFO buffer system according to the present invention.

FIG. 6 is a schematic drawing of an alternate configuration of the read counter 6 depicted in FIG. 1. The read counter 6 of this embodiment comprises a linear feedback shift register (LFSR) 60, but achieves the same or similar function of indicating the previous counter setting to the read address decoder 10 (shown in FIG. 1). Of course, however, the linear feedback shift register (LFSR) 60 should be seeded with a signal other than all 0s following a reset operation.

Figure 7:
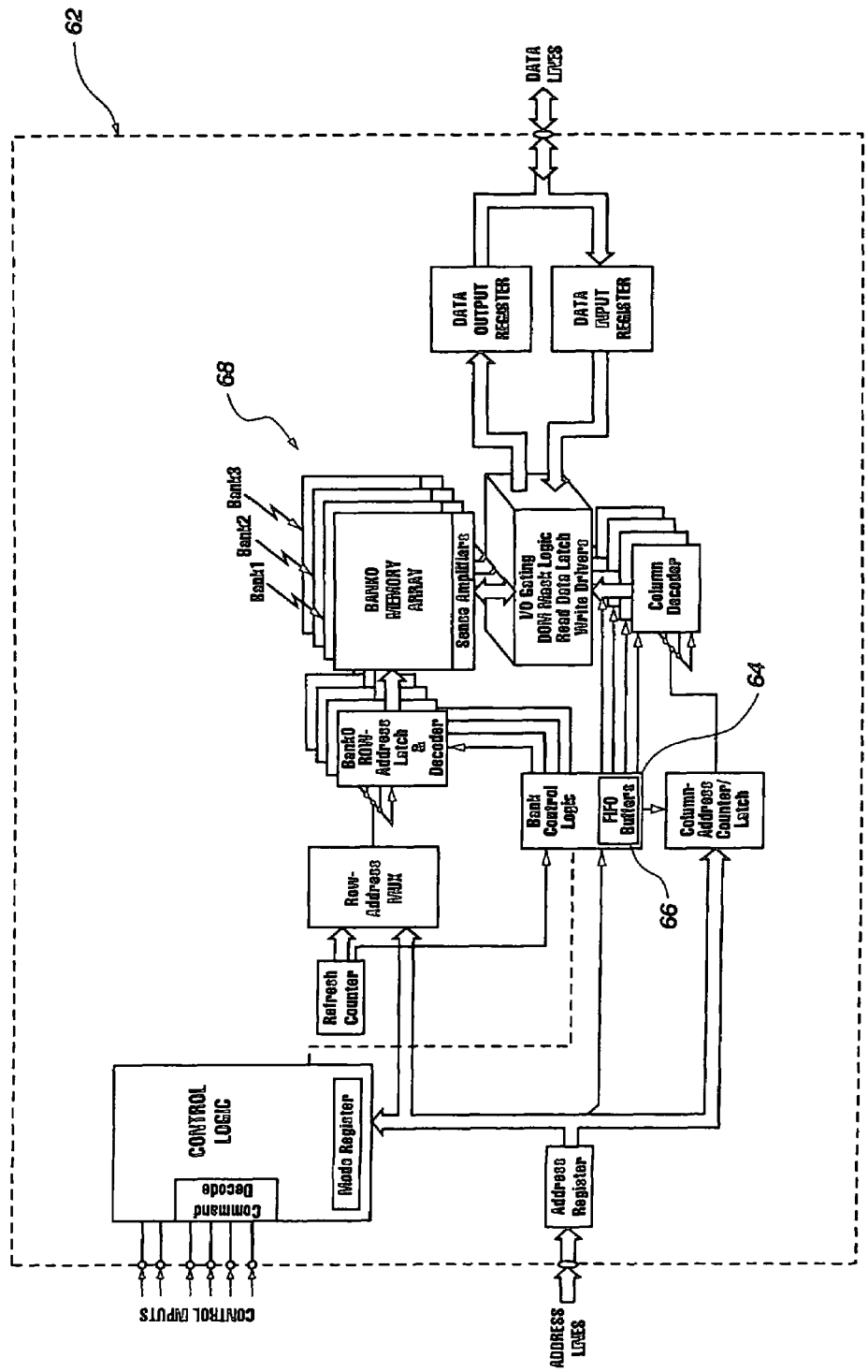
FIG. 7 is a block diagram of a DRAM including a bank central logic circuit having a register and a FIFO buffer according to an embodiment of the invention.

FIG. 7 is a block diagram of a DRAM circuit 62 employing bank control logic 64 having FIFO buffers 66 which uses a read counter according to the invention. Though in the embodiment shown, the memory bank array 68 comprises only four memory banks, the invention discussed herein may be employed in any DRAM circuit.

Figure 8:
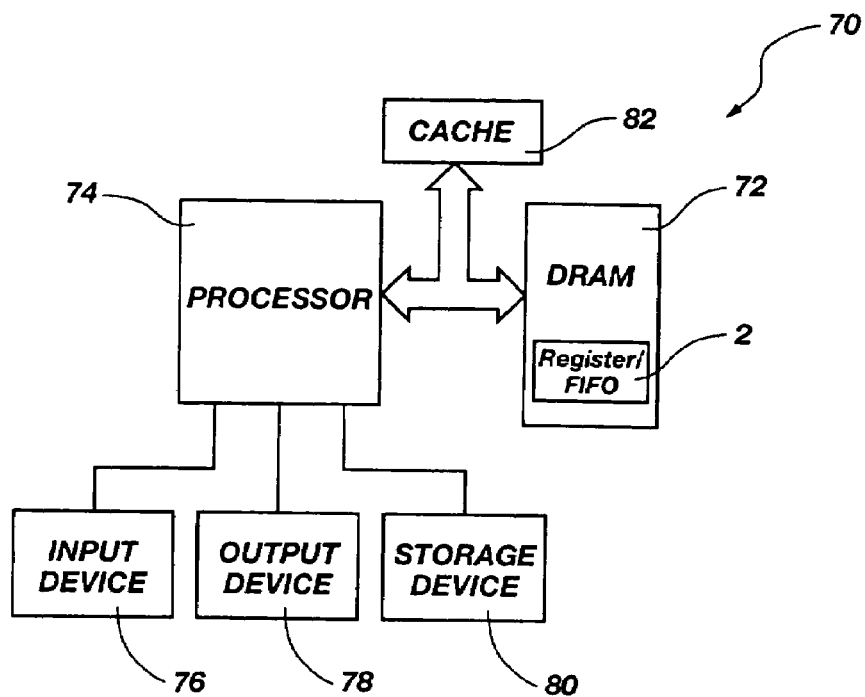
FIG. 8 is a block diagram of a computer system including DRAM according to the present invention.

FIG. 8 is a block diagram of an electronic system 70 which includes DRAM 72 comprising the register/FIFO circuit 2 as shown in FIG. 1. Any of the specific preferred embodiments as shown in FIGS. 1-6, or many other specific embodiments not shown herein but which accomplish similar designs, may also be used. The electronic system 70 includes a processor 74 for performing various computing functions, such as executing specific software to perform specific calculations or tasks. Additionally, the electronic system 70 includes one or more input devices 76, such as a keyboard or a mouse, coupled to the processor 74 to allow an operator to interface with the electronic system 70. Typically, the electronic system 70 also includes one or more output devices 78 coupled to the processor 74, such output devices typically being a printer, a video terminal or a network connection. One or more data storage devices 80 are also typically coupled to the processor 74 to store data or retrieve data from external storage media (not shown). Examples of typical data storage devices 80 include magnetic hard and floppy disks, tape cassettes, and writeable compact disks (CDs). The processor 74 is also typically coupled to a cache memory 82, which is usually static random access memory ("SDRAM"), and to the DRAM 72. It will be understood, however, that the register/FIFO circuit 2 may also be incorporated into any one of the input, output and data storage devices 76, 78 and 80.

Figure 9:
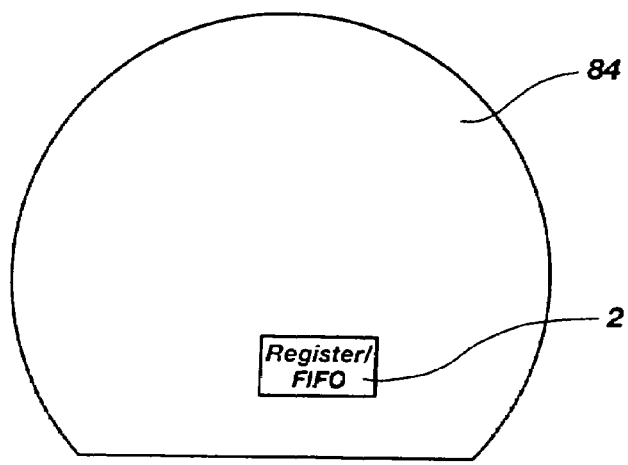
FIG. 9 is a block diagram of a semiconductor wafer having DRAM thereon according to the present invention.

As shown in FIG. 9, the register/FIFO circuit 2 of FIG. 1 is fabricated on the surface of a semiconductor wafer 84 of silicon, gallium arsenide, or indium phosphide in accordance with this invention. It will be understood that, alternatively, the specific preferred embodiments of the register/FIFO circuit 2 shown in FIGS. 1-6 may also be fabricated, and that one of skill in the art would know how to adapt such designs for a specific chip architecture or semiconductor fabrication process. Of course, it should be understood that the register/FIFO circuit 2 may be fabricated on semiconductor substrates other than a wafer, such as a Silicon-on-Insulator (SOI) substrate, a Silicon-on-Glass (SOG) substrate, a Silicon-on-Sapphire (SOS) substrate, or other semiconductor material layers on supporting substrates.

As will be clear to one of ordinary skill in the art, the FIFO buffer system shown and described herein, though depicted as an address buffer for DRAM, is not limited to application in DRAM. One of ordinary skill will understand how to apply particular embodiments of the FIFO buffer system to other systems where a FIFO buffer system may be useful, such as telecommunications systems.

Although the present invention has been shown and described with reference to particular preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A method of storing data in a DRAM, comprising:
providing a DRAM including a plurality of FIFO buffers and a read counter associated with the plurality of FIFO buffers and pointing at a first one of the plurality of FIFO buffers;
transmitting a first read latch signal to the read counter; and
maintaining the read counter pointing at the first one of the plurality of FIFO buffers after transmitting the first read latch signal to the read counter.

2. The method of claim 1, further comprising:
transmitting a second read latch signal to the read counter; and
adjusting the read counter to point at a second one of the plurality of FIFO buffers in response to the second read latch signal.

3. The method of claim 1, further comprising transmitting a reset signal through a reset input to the read counter prior to transmitting the first read latch signal.

4. The method of claim 1, further comprising:
providing a write counter associated with the plurality of FIFO buffers and pointing at the first one of the plurality of FIFO buffers;
transmitting a first write latch signal to the write counter; and
adjusting the write counter to point at the second one of the plurality of FIFO buffers in response to the first write latch signal.

5. The method of claim 4, further comprising transmitting a reset signal through a reset input to the write counter prior to transmitting the first write latch signal.

6. The method of claim 1, wherein the plurality of FIFO buffers comprises a sequential plurality of FIFO buffers, and wherein the read counter and a write counter each point at a different one of the sequential plurality of FIFO buffers, and the write counter is maintained to point at least one FIFO buffer ahead of the FIFO buffer in the sequential plurality of FIFO buffers to which the read counter is pointing.

7. A DRAM, comprising:
a plurality of FIFO buffers; and
a read counter associated with the plurality of FIFO buffers and configured to point at a first one of the plurality of FIFO buffers and further configured to receive a first read latch signal and to maintain the read counter pointing at the first one of the plurality of FIFO buffers after receiving the first read latch signal.

8. The DRAM of claim 7, wherein the read counter is further configured to point at a second one of the plurality of FIFO buffers in response to a second read latch signal.

9. The DRAM of claim 7, further comprising:
a write counter associated with the plurality of FIFO buffers and configured to point at a first of the plurality of FIFO buffers and further configured to receive a first write latch signal and to adjust the write counter to point at a second one of the plurality of FIFO buffers in response to the first write latch signal.

10. The DRAM of claim 9, wherein the plurality of FIFO buffers comprises a sequential plurality of FIFO buffers, and wherein the read counter and the write counter each point at a different one of the sequential plurality of FIFO buffers, and the write counter is maintained to point at least one FIFO buffer ahead of the FIFO buffer in the sequential plurality of FIFO buffers to which the read counter is pointing.

* * * * *

UNITED STATES PATENT AND TRADEMARK OFFICE
CERTIFICATE OF CORRECTION

PATENT NO. : 7,698,499 B2 Page 1 of 1
APPLICATION NO. : 11/496302
DATED : April 13, 2010
INVENTOR(S) : Brian Johnson It is certified that error appears in the above-identified patent and that said Letters Patent is hereby corrected as shown below:

In column 8, line 27, in Claim 4, delete "at the" and insert -- at a --, therefor.

Signed and Sealed this

Fifteenth Day of June, 2010

David J. Kappos
*Director of the United States Patent and Trademark Office*